No. 801,000. PATENTED OCT. 3, 1905.
W. Y. GAMBEE.
AUTOMOBILE STEERING GEAR.
APPLICATION FILED FEB. 4, 1905.
2 SHEETS—SHEET 2.
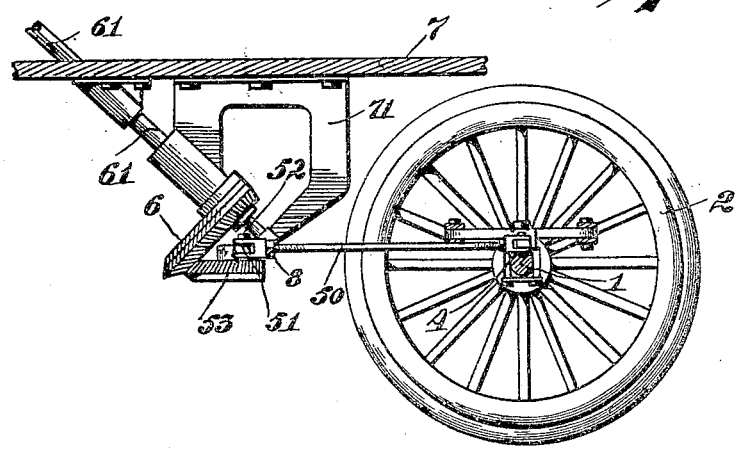
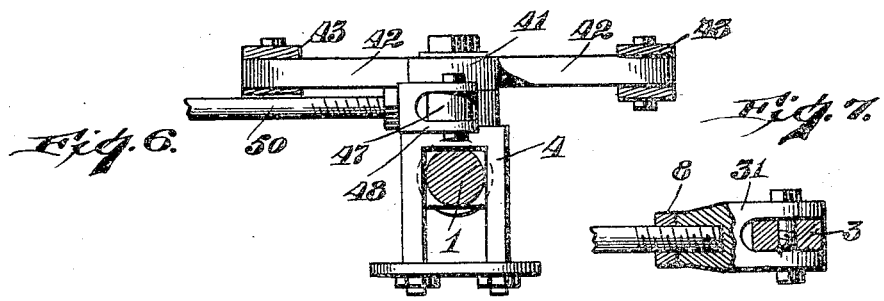
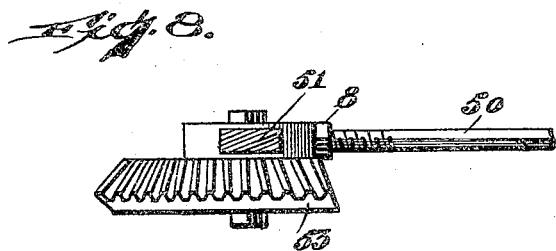
Witnesses
Inventor
WILLIAM Y GAMBEE

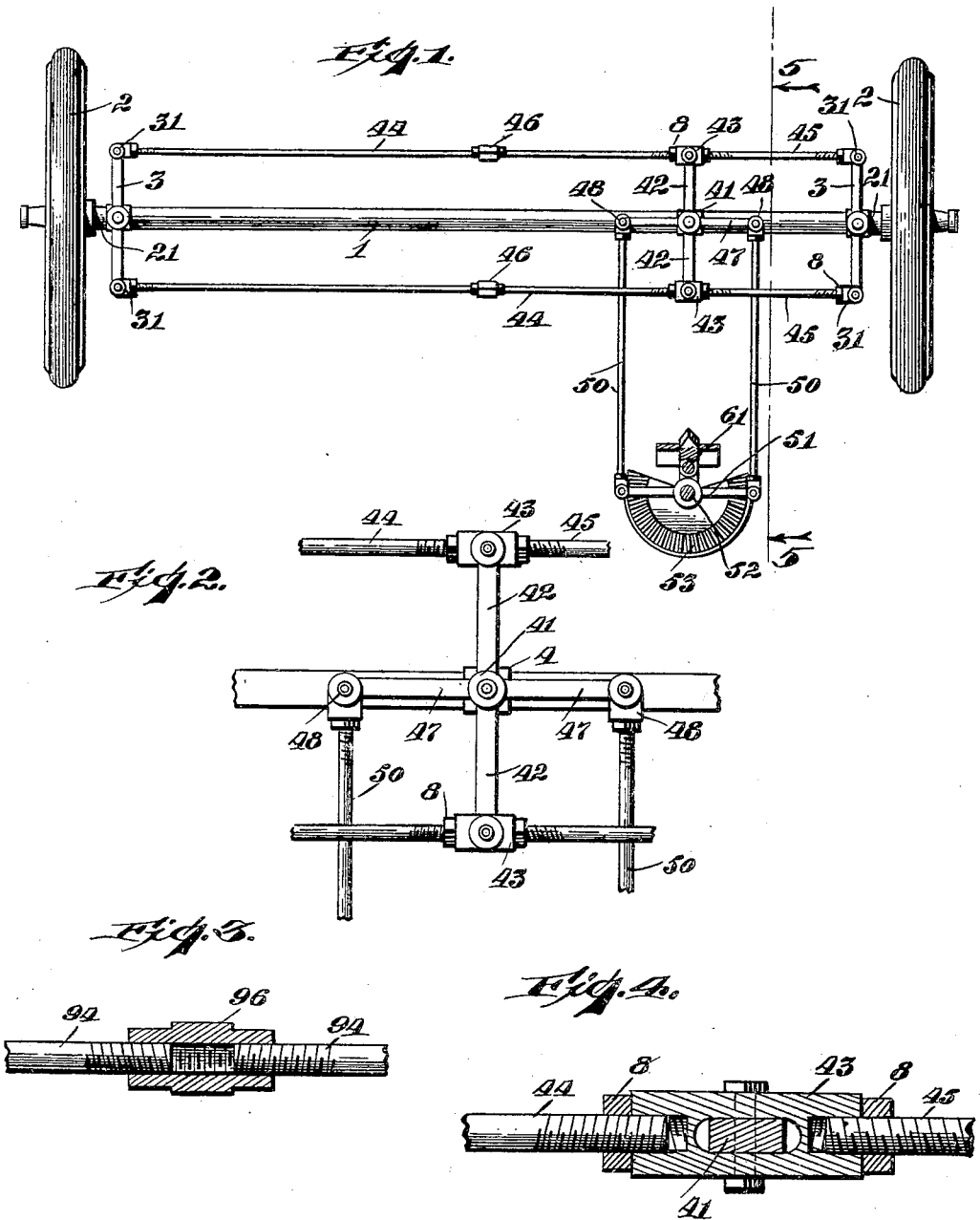

UNITED STATES PATENT OFFICE.

WILLIAM Y. GAMBEE, OF NEW YORK, N. Y.

AUTOMOBILE STEERING-GEAR.

No. 801,000.      Specification of Letters Patent.      Patented Oct. 3, 1905.

Application filed February 4, 1905. Serial No. 244,121.

*To all whom it may concern:*

Be it known that I, WILLIAM Y. GAMBEE, a citizen of the United States, and a resident of the borough of Manhattan, city, county, and State of New York, have invented certain new and useful Improvements in Automobile Steering-Gear, of which the following is a specification.

My invention relates to steering-gear for automobiles or other vehicles, and provides means whereby such steering-gears and their connections are materially strengthened without causing the parts to appear clumsy and by which means are provided for taking up all wear or lost motion.

Figure 1 represents in plan view the steering-gear, front shaft, and front wheels of an automobile or like vehicle. Fig. 2 is a like view of the detached portion on a large scale. Figs. 3 and 4 are vertical sections showing details of construction, Fig. 3 showing a somewhat modified form. Fig. 5 is a vertical section on the line 5 5 of Fig. 1, showing in addition a part of the vehicle-base. Fig. 6, enlarged, shows a portion of Fig. 5. Figs. 7 and 8 show details.

1 designates the front shaft of an automobile, at the ends of which are swiveled the wheels 2 in the usual manner. To the inner ends of the spindles 21, on which the wheels 2 revolve, are rigidly secured yoke-levers 3, which extend both forwardly and rearwardly from their central points and have pivotally-attached sockets 31 at their ends. Secured at any convenient point, preferably on the stationary axle 1, is a yoke 4, to the upper side of which is pivoted a cross-head or four-armed lever 41. To the forwardly and rearwardly extending arms 42 of the lever 41 are pivoted double-ended sockets 43, connected by rods 44 45 with the sockets 31 on the two-armed levers 3. The ends of the rods 44 45 are preferably right and left threaded, so that their turning may serve to screw together or force apart the sockets 43 and 31, which they connect. I have shown the rods 44 as having hexagonal blocks 46 rigidly secured thereon to engage an ordinary wrench; but it is understood that this is for convenience only, the rods 45 being not so provided and being adapted to be turned by a Stilson or like pipe wrench or by tongs.

At the outer ends of the laterally-extending arms 47 of the lever 41 are pivoted sockets 48, from each of which a rod 50 extends rearwardly to a two-armed lever 51, secured on the axle 52 by a segmental rack 53. With the bevel-teeth of the rack 53 mesh the teeth of a bevel and preferably segmental gear 6, the inclined axle 61 of which passes upwardly through the base 7 of the vehicle and may of course be provided at its upper end with a wheel, lever, or other steering-handle. (Not shown.) The axles 52 and 61 of the rack 51 and pinion 6, respectively, have bearing in a bracket 71, secured below the base or bottom of the automobile. At the ends of all the connecting-rods 44, 45, and 50 are preferably placed jam-nuts 8 to prevent accidental disengagement.

In the modification shown in Fig. 3 of the drawings a connecting-rod 94, corresponding in position to the rod 44 of Fig. 1, is shown as in two parts, right and left threaded at their adjacent ends and connected by a right-and-left coupling 96. This is obviously a mere equivalent for the take-up device above described and is introduced to illustrate the fact that other mechanical alterations can be made in the form and arrangement of parts without departing from my invention.

It will be seen that my invention covers much more than a mere duplication of the connecting-rods of former devices in that it makes of the connected parts a rigid truss, whereby loosening of parts due to vibration is eliminated and ready means provided for taking up all slack or lost motion caused by wear. To prevent running off of automobile-wheels, it is customary to "gather" them—*i. e.*, to slightly converge them toward their front edges. My device enables this to be done with great exactness, so that running off, on the one hand, and the unequal wear of tires, on the other hand, are both avoided.

What I claim as my invention is—

1. In a vehicle steering-gear, two-armed levers secured to the wheel-spindles, a four-armed lever pivoted intermediate said spindle-levers, a connection between each end of said spindle-levers and corresponding ends of two arms of said intermediate lever, and steering-gear for turning said intermediate lever connected to the other two arms thereof.

2. In a vehicle steering-gear, two-armed levers secured to the wheel-spindles, a lever having corresponding arms pivoted intermediate said spindle-levers, a longitudinally-adjustable connection between each end of said spindle-levers and corresponding ends of said intermediate lever, and steering-gear for turning said intermediate lever.

3. In a vehicle steering-gear, two-armed levers secured to the wheel-spindles, a lever having corresponding arms pivoted intermediate said spindle-levers, pivotally-attached sockets at each end of each of said levers, and longitudinally-adjustable rods connecting said sockets.

4. In a vehicle steering-gear, two-armed levers secured to the wheel-spindles, a lever having corresponding arms pivoted intermediate said spindle-levers, pivotally-attached sockets at each end of each of said levers, and means common to said sockets and said rods for varying the effective length of the latter.

5. In a vehicle steering-gear, a two-armed pivoted lever, means for turning said lever on its pivot to steer the vehicle, a lever intermediate of and connected to the vehicle wheel-spindles and having arms corresponding to those of said first-named lever, and a connecting-rod between each end of each of said levers.

6. In a vehicle steering-gear, two-armed levers secured to the wheel-spindles, a four-armed lever pivoted intermediate said spindle-levers, a rotatable steering-head, a two-armed lever secured to said steering-head for turning therewith, connections between each arm of each of said spindle-levers and each end of the corresponding arms of said four-armed lever, and connections between each arm of said steering-head lever and each of the other arms of said four-armed lever.

In testimony whereof I have signed this specification in the presence of two subscribing witnesses.

WILLIAM Y. GAMBEE.

Witnesses:
E. VAN ZANDT,
H. L. OBERTEUFFER.